United States Patent [19]

Reph

[11] 4,391,475
[45] Jul. 5, 1983

[54] COLUMN INSERT BEARING HOUSING

[75] Inventor: Arthur C. Reph, Cherryville, Pa.

[73] Assignee: Ingersoll-Rand Company, Woodcliff Lake, N.J.

[21] Appl. No.: 229,964

[22] Filed: Jan. 30, 1981

[51] Int. Cl.³ ............................................ F16C 23/02
[52] U.S. Cl. .................................. 384/226; 384/442
[58] Field of Search ...................... 308/27, 58, 31, 22, 308/29, 32, 33, 15

[56] References Cited

U.S. PATENT DOCUMENTS

| 1,652,368 | 12/1927 | Layne | 308/27 |
| 3,180,696 | 4/1965 | Buse | 308/15 |
| 3,820,860 | 6/1974 | Stone | 308/27 |

Primary Examiner—Lenard A. Footland
Attorney, Agent, or Firm—R. J. Falkowski

[57] ABSTRACT

A column and bearing assembly having a column, a shaft in the column and a guide bearing means disposed in the column to support the shaft.

7 Claims, 5 Drawing Figures

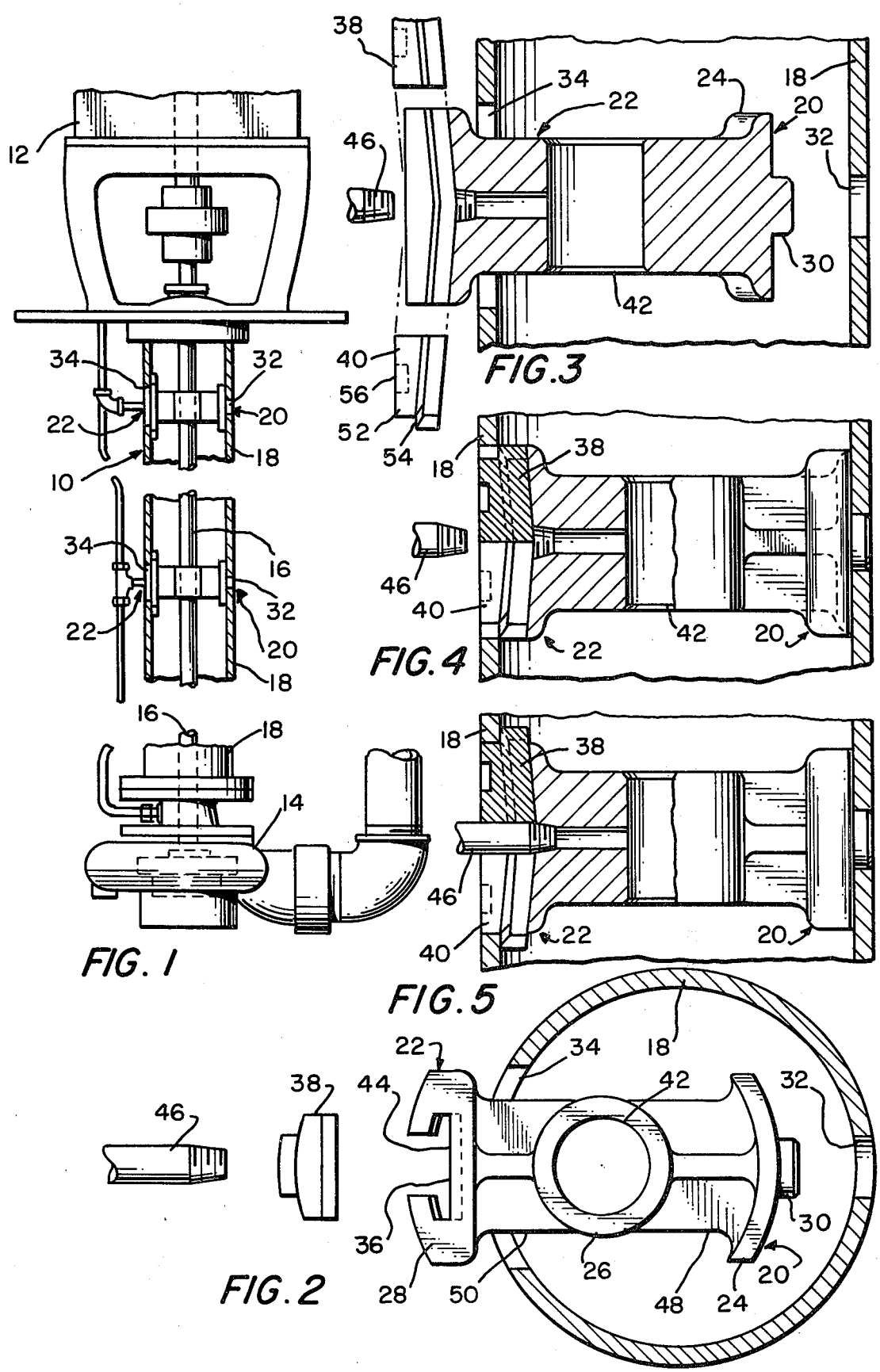

COLUMN INSERT BEARING HOUSING

BACKGROUND OF THE INVENTION

1. Field of the Invention

This invention relates to a vertical pump assembly, and more particularly to a column and bearing assembly housing a shaft.

2. Description of the Prior Art

In U.S. Pat. No. 3,180,696 to Buse, a vertical pump assembly is described. A vertical shaft communicates with a standard pump and a standard motor to drive the pump. A column surrounding the shaft is provided. Inserted into the column are bearing assemblies which guide the shaft and provide wear services for contacting the shaft.

While the column aand bearing assembly disclosed in this patent work well, improved column and bearing assemblies have been sought.

SUMMARY OF THE INVENTION

This invention relates to a column and bearing assembly. A shaft is located in the column and a guide bearing means is disposed in the column to support the shaft. The guide bearing means has a housing extending into the column wherein the housing has a first surface contacting the inside surface of the column. The guide bearing means further has a wearing surface for the shaft and a locking means of attaching the guide bearing means to the column.

BRIEF DESCRIPTION OF THE DRAWINGS

FIG. 1 is a sectional view of a vertical pump assembly showing the location of a guide bearing means in relation to the column.

FIG. 2 is a horizontal sectional view of a column and guide bearing means.

FIGS. 3-5 are vertical sectional views of the column and guide bearing means.

DESCRIPTION OF THE PREFERRED EMBODIMENTS

In FIG. 1, a column and bearing assembly 10 is shown. Column and bearing assembly 10 is vertically located between a standard pump motor 12 and a standard pump 14. Column and bearing assembly 10 contain a vertical shaft 16 located within vertical column 18. Shaft 16 communicates with standard motor 12 and standard pump 14. Guide bearing means 20 is provided within column 18 to provide shaft 16. Guide bearing means 20 may be made of conventional material such as iron, steel, or fiberglass. As shown in the FIG. 2, guide bearing means 20 is comprised of a guide bearing housing 22. Guide bearing housing 22 has a first section 24, a second section 26 and a third section 28. First section 24 is contoured to fit against the inside surface of column 18. Guide bearing housing 22 is positioned within column 18 by conventional means which include a dowel 30 dimensioned to fit into a first role 32 in column 18.

Column 18 has a second hole 34 located opposite of first hole 32. Second hole 34 is large enough to allow guide bearing housing 22 to be inserted into column 18. Guide bearing means 20 further comprises a locking means for attaching guide bearing means 20 to column 18. The locking means as shown in the figures, include means such as T-slots 36 located in third section 28. As shown shown in figures 3-5, a first wedge 38 and a second wedge 40 are slid into T-slots 36. First wedge 38 and second wedge 40 are designed such that they fit into T-slots 36 in a manner that will allow guide bearing housing 22 to be inserted completely into column 18 as shown in the FIG. 4. First wedge 38 and second wedge 40 are then moved apart as shown in FIG. 5 wherein guide bearing means 20 is locked into column 18. In an embodiment of this invention, wedges 38 and 40 have a step-like shape and the length of the wedges is half the length of T-slot 36. The outer part 52 of the wedges have the same radius as guide bearing housing 22. An inner part 54 of the wedges have the same dimension as the inside diameter of column 18 and preferably forms a contact arc of 30° when in place. An indention 56 in the wedges is provided for removal.

A wearing surface is provided in second section 26 of guide bearing means 20. The wearing surface allows rotation of shaft 18 while also providing guide to shaft 16. The wearing surface includes conventional wear surface such as a cylindrical hole forming a bearing 42 as shown in FIG. 2. The bearing may also be a sleeve inserted into the cylindrical hole. Lubrication may also be provided to the wear surface. As shown in FIGS. 2-5, a tapped hole 44 is provided which provides an opening to bearing 42. A nipple 46 is also provided which communicates with tapped hole 44. Nipple 46 as shown in FIG. 5 also provides a means for maintaining first wedge 38 and second wedge 40 apart in a locking position. Nipple 46 may communicate with a lubricant source for providing lubricant to bearing 42.

Second section 26 is connected to first section 24 and third section 28 by means of x-shaped structures 48 and 50. The guide bearing housing 22 snugly fits into first hole 32 and second hole 34.

According to the present invention, it is not necessary to machine column 18 for the guide bearing means 20 to be positioned accurately in column 18. The present invention allows for the use of a one-piece column and parts that can be casted or molded to the proper shape and size which eliminates drilling, tapping, and machining. The guide bearing housing 22 locks to the interior wall of column 18 which reduces the time and the number of tools required for assembly. The assembly also permits the sealing of the shaft and bearings and foreign matter.

I claim:

1. A column and bearing assembly comprising:
   a. a column having a side with an opening and an inside surface;
   b. a shaft in the column; and
   c. a guide bearing means disposed in the column to support the shaft, the guide bearing means comprising:
      (1) a removable housing having a size enabling insertion through the opening in the column and extending into the column, the housing having a first surface contacting the inside surface of the column;
      (2) a wear surface for enclosing and supporting the shaft; and
      (3) a locking means for attaching and receiving the guide bearing means within the opening to the column.

2. A column and bearing assembly according to claim 1 wherein the housing has a first section contoured to fit against the inside surface of the column.

3. A column and bearing assembly according to claim 1 wherein the column further comprises a second opening opposite the first opening.

4. A column and bearing assembly according to claim 1 wherein the locking means comprises a T-slot in the housing and a first and second wedge insertable into said T-slot.

5. A column and bearing assembly according to claim 4 comprising a pin insertable between said first and second wedges having a size selected to separate said wedges by a selected amount.

6. A column and bearing assembly according to claim 5 wherein said wedges have surfaces contoured to engage the inside surface of the column upon insertion of said pin.

7. A column and bearing assembly comprising:
a column having an inside surface;
a shaft in the column; and
a guide bearing means disposed in the column to support the shaft, the guide bearing means comprising:
   a housing extending into the column, the housing having a first surface contacting the inside surface of the column;
   a wear surface for the shaft; and
   a locking means for attaching the guide bearing means to the column;
wherein the column has a first hole to allow insertion of the housing.

* * * * *